United States Patent
Yang et al.

(10) Patent No.: US 10,558,992 B2
(45) Date of Patent: Feb. 11, 2020

(54) DIFFERENT USER TRANSACTIONS ON A GRAPHICAL USER INTERFACE

(71) Applicant: PAYPAL, INC., San Jose, CA (US)

(72) Inventors: Baichuan Yang, San Jose, CA (US); Daniel Thurman Usewick, Annapolis, MD (US); Kalyani Srinivas, San Jose, CA (US); Neha Mundada, San Jose, CA (US); Hagar Levy, Campbell, CA (US); Adrian Martinez Perez, Union City, CA (US)

(73) Assignee: PayPal, Inc., San Jose, CA (US)

( * ) Notice: Subject to any disclaimer, the term of this patent is extended or adjusted under 35 U.S.C. 154(b) by 736 days.

(21) Appl. No.: 15/179,924

(22) Filed: Jun. 10, 2016

(65) Prior Publication Data
US 2017/0357992 A1  Dec. 14, 2017

(51) Int. Cl.
G06Q 30/02 (2012.01)
G06Q 40/02 (2012.01)

(52) U.S. Cl.
CPC ....... *G06Q 30/0215* (2013.01); *G06Q 40/025* (2013.01)

(58) Field of Classification Search
CPC ........ G06Q 10/00; G06Q 20/00; G06Q 30/00; G06Q 40/00
USPC .................................. 705/3–44, 65
See application file for complete search history.

(56) References Cited

U.S. PATENT DOCUMENTS

| | | | | |
|---|---|---|---|---|
| 7,945,512 | B2 * | 5/2011 | Scipioni | G06Q 20/04 705/30 |
| 8,380,577 | B2 * | 2/2013 | Chen | G06Q 30/02 705/26.1 |
| 8,639,622 | B1 * | 1/2014 | Moore | G06Q 20/405 705/35 |
| 8,700,512 | B1 * | 4/2014 | Kuznetsov | G06Q 40/00 705/35 |
| 8,719,132 | B1 * | 5/2014 | Diggdon | G06Q 20/405 705/35 |
| 8,732,076 | B2 * | 5/2014 | Scipioni | G06Q 20/04 705/39 |
| 2012/0290367 | A1 * | 11/2012 | Scipioni | G06Q 20/04 705/14.1 |
| 2014/0136365 | A1 * | 5/2014 | Nista | G06Q 30/06 705/26.8 |

(Continued)

OTHER PUBLICATIONS

Summers, "Emergence of immediate funds transfer as a general-purpose means of payment", Economic Perspectives. Federal Reserve Bank of Chicago. (Year: 2011).*

(Continued)

*Primary Examiner* — Frantzy Poinvil
(74) *Attorney, Agent, or Firm* — Haynes and Boone LLP

(57) ABSTRACT

Systems and methods that facilitate user savings through a graphical user interface (GUI) are described. A savings account for a desired item is created based on input received from a user through the GUI. After a purchase, the user can add a percentage of the purchase or a set amount to the savings account. The price of the desired item is monitored, and the user is informed of price reductions and other incentives on the desired item. Users can be offered credit at various times, such as when the user is not on track to meet a savings goal or a low price for the desired item is being offered for a limited time.

20 Claims, 7 Drawing Sheets

(56) References Cited

U.S. PATENT DOCUMENTS

2016/0232526 A1* 8/2016 Vasant Akole ...... G06Q 20/405
2016/0350864 A1* 12/2016 Dintenfass ............. G06Q 40/12
2018/0137455 A1* 5/2018 Mack ..................... G06Q 10/04

OTHER PUBLICATIONS

Welcome to the Times Currency Servcices: When it comes to moving money overseas, more and more of our readers are looking for a different way of doing things . . . The Times retrieved from https://search.proquest.com/docview/2156428595?accountid=14753 . (Year: 2018).*

* cited by examiner

Create Piggy Bank

Let's get it set up!

200A

205 — Name

205 — Why

205 — Target goal | How long

205 — How much % on each purchase | >

Save

FIG. 2A

DIFFERENT USER TRANSACTIONS ON A GRAPHICAL USER INTERFACE

BACKGROUND

The present invention generally relates to providing a graphical user interface (GUI) that allows a user to perform different types of transactions, and more specifically to providing a GUI that presents one or more savings and/or credit options to a user during a checkout process.

People may have a difficult time with saving for specific items in the long-term, adherence to a budget, prioritizing spending, spending habits, and money management in general. Often, money is spent spontaneously such that there is not enough money in the budget to buy desired items. Many are then forced to go over budget and borrow money at less than favorable terms.

Accordingly, a need exists for systems and methods that provide a mechanism that facilitates user participation in a savings program.

BRIEF DESCRIPTION OF THE FIGURES

FIGS. 2A-2C are webpages illustrating how a user creates and funds a savings account according to an embodiment of the present disclosure.

Figure 1:
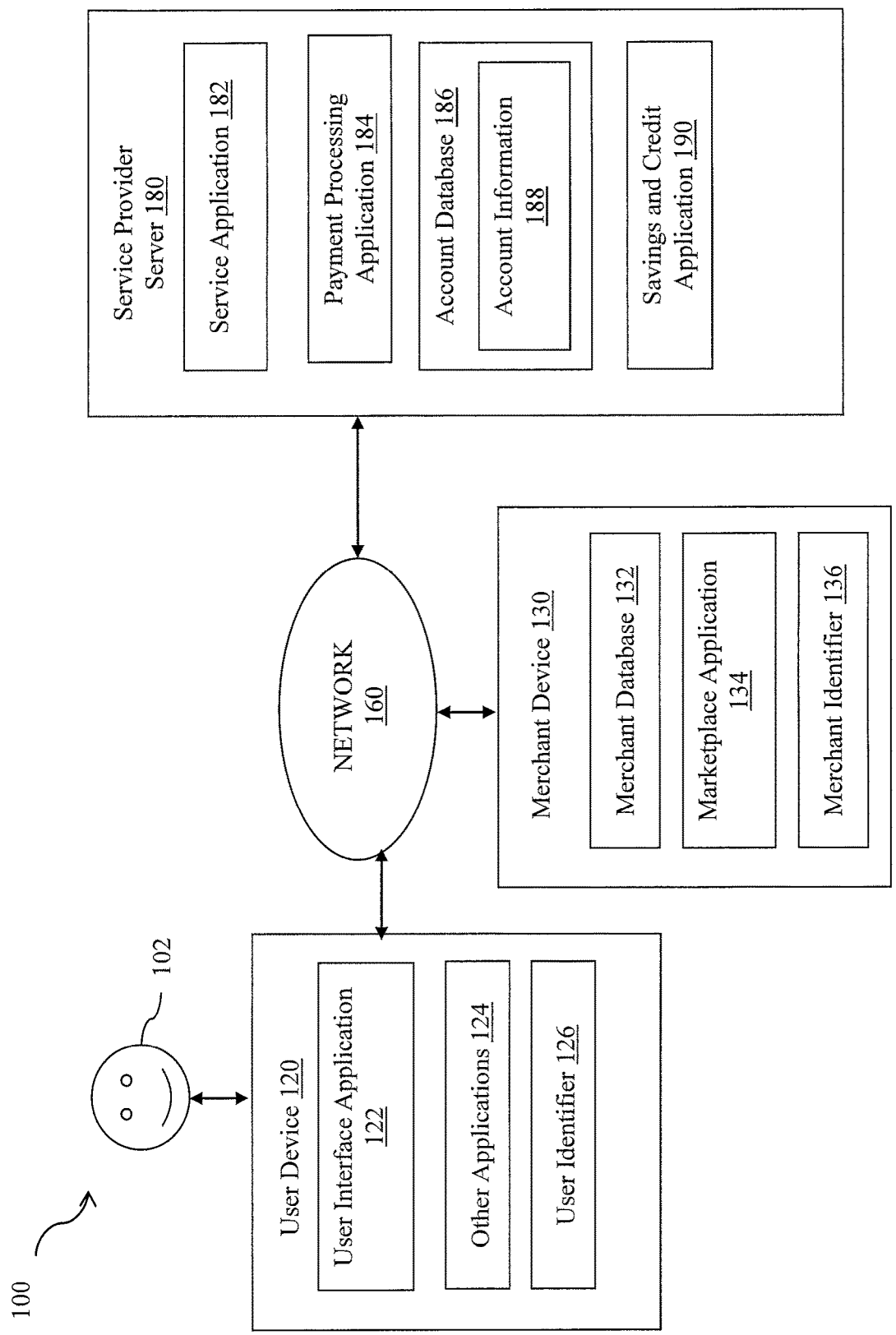
FIG. 1 is a block diagram illustrating a system for facilitating saving through a GUI according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure is directed to a GUI that aids users in saving or funding a desired purchase of one or more items. In several embodiments, a service provider creates a savings account (or electronic piggy bank) for a user, and the savings account is an addition or feature to a digital wallet managed by the service provider that allows users to contribute money to the savings account. The savings account may be created to save for a specific item or service (generally referred to as an item), such as a phone, vacation, laptop, shoes, wedding ring, wedding, television, Christmas, car, computer, motorcycle, memorial for a funeral, or the like.

In some embodiments, multiple savings accounts (or piggy banks) are created. Each savings account can be designated for a specific item. For example, one savings account can be used to save for a vacation, while a second savings account can be used to save for a computer.

The user can add money to the savings account during a checkout transaction for a purchase on a GUI, where the amount added may be a percentage of the purchase transaction processed through the digital wallet, a flat dollar or set amount, or it may be based on other criteria (e.g., total amount to be saved divided by a target deadline for purchasing an item or other user-defined parameters).

In some embodiments, when the user accesses the digital wallet to check balances, pay fees, etc., the user can be presented with options for putting money in a savings account. In other embodiments, the service provider suggests how much the user should save based on the purchase history of the user. For example, the service provider can analyze what the user buys when shopping, how often the user shops, and how much the user typically spends per shopping session to decide how much money the user should put away in the savings account. Responsive to the user entering an amount to put in the savings account or selecting one of the presented savings options, an amount is transferred from an account of a user (e.g., bank account or debit card account) to the savings account.

In several embodiments, each time the service provider is used to process a purchase transaction, money can also be put in the savings account. This approach allows users to choose and customize savings options, for example, to transfer a percentage or set amount of any financial transaction into savings. In this regard, the user is saving on each purchase transaction. Advantageously, the approach combines purchasing (or payment) with a savings aspect. In this manner, the user is actually moving money into a savings account when paying a bill or purchasing an item.

In embodiments where there are multiple savings accounts, the user can decide how much money to place in each savings account. For example, the user can choose to place the same amount in all the savings accounts or different amounts in each of the savings accounts. The GUI, in various embodiments, allows the user to select the specific amount or percentage to place in each savings account during checkout. For example, the GUI can ask the user how much money the user wants to put in a savings account designated for a vacation and how much money the user wants to put in a savings account designated for a car. The user can then select or input an amount to place in each savings account. The service provider may also or alternatively provide the user with a suggested amount or amounts, which the user can select or modify.

In various embodiments, after the service provider determines that the user is saving for one or more specific items, the service provider initiates searching and monitoring of merchant websites for the one or more specific items. In some embodiments, the service provider provides notice of a price reduction or a "hot" deal of a specific item, along with the time needed to make the purchase ahead of a previously set savings goal. The merchant associated with the item may offer discounts on goals listed in the savings account and "lock in" sale prices or offer other sales incentives.

For example, the service provider can make use of web scraping software to retrieve prices from several merchant websites and present special deals to the user. The service provider monitors and obtains updated price information from a plurality of merchants that sell or offer one or more of the specific items. With updated pricing information, the service provider identifies those users that may benefit from the updated pricing and notifies the impacted users by sending a notification. The notification may be, for example, displayed on a GUI when a user accesses his or her digital wallet.

In several embodiments, the service provider offers credit to the user at various times, such as when the user is not on track for meeting the savings goal, or a low price for an item is offered for a limited time. The money owed to the service provider may be paid off using any suitable means, but in certain embodiments, the money is paid off through the same savings mechanism provided for the savings account. That is, the user may be prompted to transfer funds to a savings account that will be used to pay off all or a portion of the debt whenever the user accesses his or her digital wallet. The user can choose to use the credit at any point, not only if he or she wants to take advantage of a special price or promotion.

In some embodiments, the service provider attempts to find a better rate for the user by checking with other lenders (e.g., banks, credit card companies, etc.). If a better rate is found, the service provider can notify the user, and the user can decide to accept credit with someone other than the service provider.

In several embodiments, once the user has sufficient funds to purchase a desired item, the service provider processes the transaction automatically (e.g., transfers the funds to the merchant to facilitate delivery of the item to the user). In other embodiments, the service provider sends a notification to the user to ask if the user would like to purchase the item. In certain embodiments, once the transaction has been processed or the item has been purchased, the service provider deletes or removes the savings account associated with the item from the digital wallet of the user.

The present disclosure relates to a specific type of GUI. The GUI manages the interactions between a computer system and a user through graphical elements on a display. Based on interactions between the GUI and the user, a user is able to save money, pay money back to the service provider (or other lender), and be notified of special deals and offers on items of interest while engaged in checkout transaction for an item that is not necessarily related to the savings, pay back, or other items of interest. As such, the content of a typical checkout page is advantageously modified to enable a user to use a single GUI to perform actions typically done with two or more different GUIs (e.g., a checkout page and a separate savings or credit page). This results in a more streamlined process for the user and improves the efficiency of a server or computer by eliminating the need to generate and display different pages and then redirect the user to different pages. All of these features are incorporated seamlessly into a digital wallet.

Advantageously, a user 102 is provided a GUI that facilitates interactions between savings goals, credit, and item pricing. The user benefits because he or she is able to handle purchasing items, saving for items, and paying back credit in one place. Merchants benefit because their updated and best prices are provided to users, and they are typically provided a guaranteed sale. The service provider benefits by overseeing the different transactions and collecting applicable fees.

While generic computer components may be used to perform the methods described herein, these computer components are able in combination to perform functions that are not merely generic. For example, monitoring prices of desired items on merchant websites, notifying a user of special deals or offers on desired items, providing credit to the user, and providing a savings mechanism for paying back the debt are not routine and conventional activities. Providing all these functionalities in a single location is an improvement in methods of facilitating saving through a GUI. A user does not waste time visiting different websites to save for an item, receive item pricing, and receive credit to pay for an item. Instead, the user is able to perform these functions (and more) on a single website.

FIG. 1 shows one embodiment of a block diagram of a network-based system 100 adapted to aid a user with saving funds with a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), one or more merchant servers or devices 130 (e.g., network server devices), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the merchant device 130 and/or the service provider server 180 over the network 160. For example, the user 102 may conduct financial transactions (e.g., account transfers, purchase transactions, etc.) with the service provider server 180 via the user device 120. The user device 120, in various embodiments, may be implemented using any appropriate combination of hardware and/or software configured for wired and/or wireless communication over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120, in one embodiment, includes a user interface application 122, which may be utilized by the user 102 to conduct transactions (e.g., shopping, purchasing, bidding, etc.) with the merchant device 130 and/or service provider server 180 over the network 160. In one aspect, purchase expenses may be directly and/or automatically debited from an account related to the user 102 via the user interface application 122.

In one implementation, the user interface application 122 comprises a software program, such as a GUI, executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The user device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the user device 120 (e.g., cell phone). The user profile may be updated with each financial and/or information transaction (e.g., payment transaction, purchase transaction, etc.) achieved through use of the user device 120. In various aspects, this may include the type of transaction and/or the location information from the user device 120. As such, the profile may be used for recognizing patterns of potential fraud, setting transaction limits on the user, etc.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The one or more merchant servers 130, in various embodiments, may be maintained by one or more business entities (or in some cases, by a partner of a business entity that processes transactions on behalf of business entities). Examples of businesses entities include merchant, resource information companies, utility companies, real estate management companies, social networking companies, etc., which offer various items for purchase and payment. In some embodiments, business entities may need registration of the user identity information as part of offering items to the user 102 over the network 160. As such, each of the one or more merchant servers 130 may include a merchant database 132 for identifying available items, which may be made available to the user device 120 for viewing and purchase by the user 102. In one or more embodiments, user 102 may complete a transaction such as purchasing the items via service provider server 180.

Each of the merchant servers 130, in one embodiment, may include a marketplace application 134, which may be configured to provide information over the network 160 to the user interface application 122 of the user device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. The merchant identifier 136 may include attributes related to the merchant server or device 130, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to a merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of the service provider as a payment intermediary. The merchant website may also have an account with the service provider.

The service provider server 180, in one embodiment, may be maintained by a transaction processing entity or an online service provider, which may provide processing for financial transactions and/or information transactions between the user 102 and one or more of the merchant servers 130. As such, the service provider server 180 includes a service application 182, which may be adapted to interact with the user device 120 over the network 160 to facilitate the searching, selection, purchase, and/or payment of items by the user 102 from the one or more merchant servers 130. In one example, the service provider server 180 may be provided by PayPal®, Inc. of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and each of the merchant servers 130. In one implementation, the payment processing application 184 assists with resolving financial transactions through validation, delivery, and settlement. As such, the service application 182 in conjunction with the payment processing module 184 settles indebtedness between the user 102 and each of the merchant servers 130, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., user 102) and merchants. For example, account information 188 may include private financial information of user 102 and merchants (e.g., one or more merchants associated with merchant servers 130), such as one or more account numbers, passwords, credit card information, banking information, or other types of financial information, which may be used to facilitate financial transactions between user 102, and one or more merchants associated with the merchant servers 130. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes a savings and credit application 190. The savings and credit application 190 receives personal information from a user 102 including, but not limited to, name, address, birth date, savings amount, savings goal, a target date for reaching a savings goal, and a percentage to save on each purchase transaction. In various embodiments, the savings and credit application 190 analyzes the purchase history of the user 102 and suggests saving options to the user 102 based on the purchase history. Once the user 102 sets up one or more savings accounts, the savings and credit application 190 tracks the user 102's progress, and displays the different savings accounts, the amounts still needed to reach the savings goals, and the time needed to reach the savings goals on a GUI.

In some embodiments, the savings and credit application 190 dynamically monitors items (e.g., goods or services) of interest for the user 102 and notifies the user 102 of special deals or offers when they become or are available. In several embodiments, the savings and credit application 190 offers credit to the user 102 in different situations. For example, credit can be offered to the user 102 when the user 102 has not yet met a savings goal for an item, and a special deal on the item will expire by the time the user 102 meets the savings goal. In this case, the difference between the balance in the savings account and the special price on the item is made up for by the offered credit.

Once the user 102 receives the credit, the user 102 can pay off the borrowed amount through the same savings mechanism used to save for the item. In other words, the user 102 can set up another savings account, indicate how much should be saved (or select among suggested savings options), and have funds transferred to the savings account every time the user 102 makes a purchase (or accesses his or her digital wallet). The account used to pay off the borrowed amount can also be the same account the user had set up for purchasing the item, such that any accrued savings may be used for paying off part of the borrowed amount and future savings into that account used to pay off remaining portions. When the savings goal is reached, the user 102 pays off the debt, and the service provider receives payment for the debt.

FIG. 2A presents a webpage 200A displayed on user device 120 that includes various input fields 205 for creating a savings account or piggy bank. As shown, the input fields 205 include a name of the user 102, a reason why the user 102 is saving (e.g., vacation, car, TV, honeymoon, etc.), a target goal (e.g., $1,000), a target date (e.g., a date when the target goal should be reached), and an indication of what percentage of a purchase transaction should be saved. The user 102 names the savings account, sets a desired savings goal, determines a time frame for reaching the savings goal, and sets an amount to be saved. In some embodiments, the service provider server 180 automatically calculates the weekly and/or monthly contribution needed and transmits or displays this information to the user 102 on the GUI.

Figure 2B:
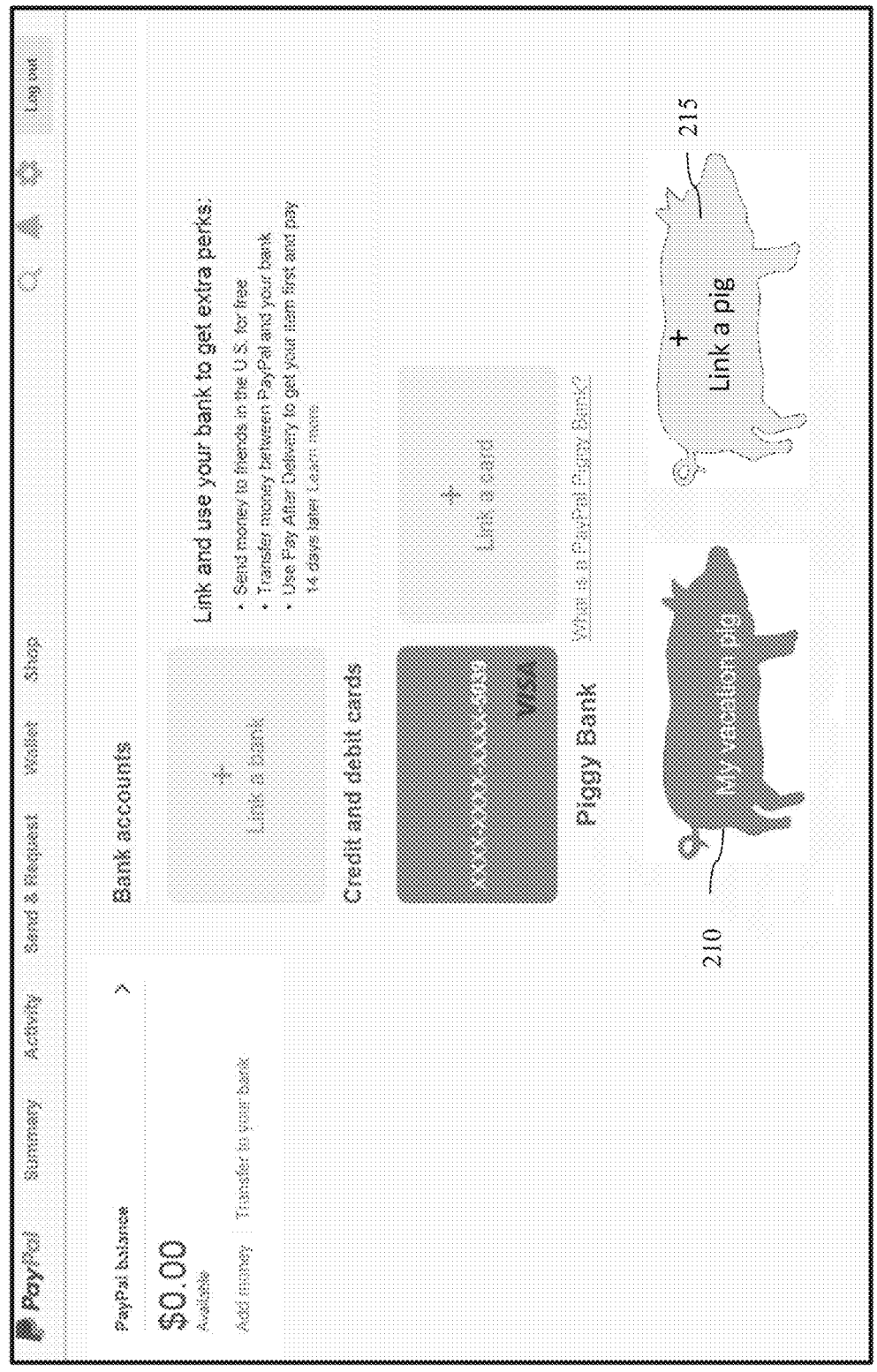

FIG. 2B presents a webpage 200B displayed on user device 120 that allows user 102 to link bank accounts and credit/debit cards to the digital wallet and displays the created savings account 210 along with a linked card(s) or bank account(s). Webpage 200B also provides user 102 the option to create another savings account by clicking on the "link a pig" button 215.

Figure 2C:
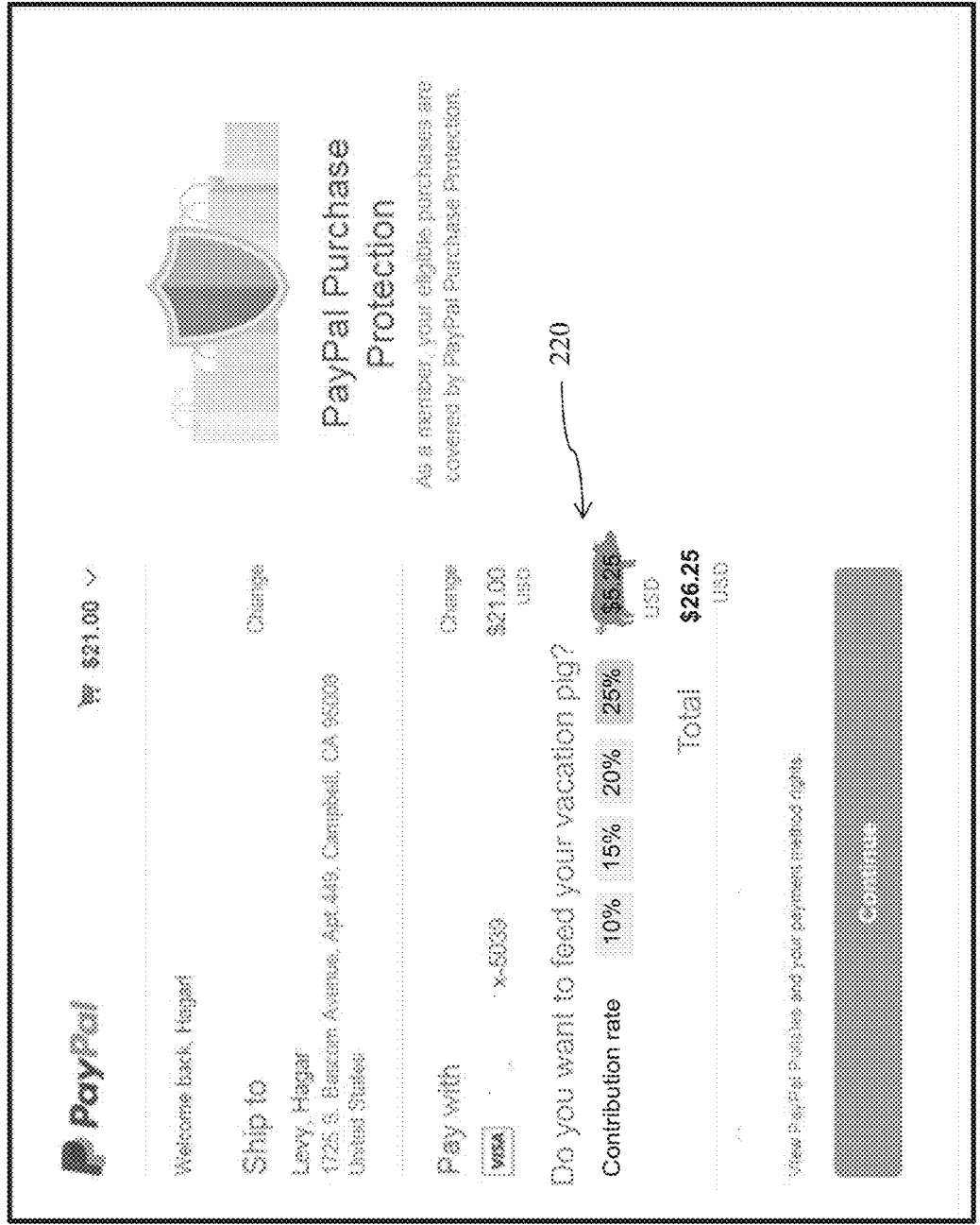

FIG. 2C presents a webpage 200C displayed on user device 120 during checkout and payment. Webpage 200C shows a price of $21 for one or more purchased items, along with several savings options 220 to feed the vacation pig 210. As shown, the savings options 220 include various percentages of the purchase price. The user 102 selects the 25% savings options to add an extra $5.25 to the purchase price of $21, making the total amount $26.25. Upon clicking the continue button, the transaction is processed so that $21 is transferred to a merchant, and $5.25 is placed in the savings account 210. In some embodiments, the percentage of the transaction to be saved is input by the user 102 or is automatically provided by the service provider server 180.

Figure 3:
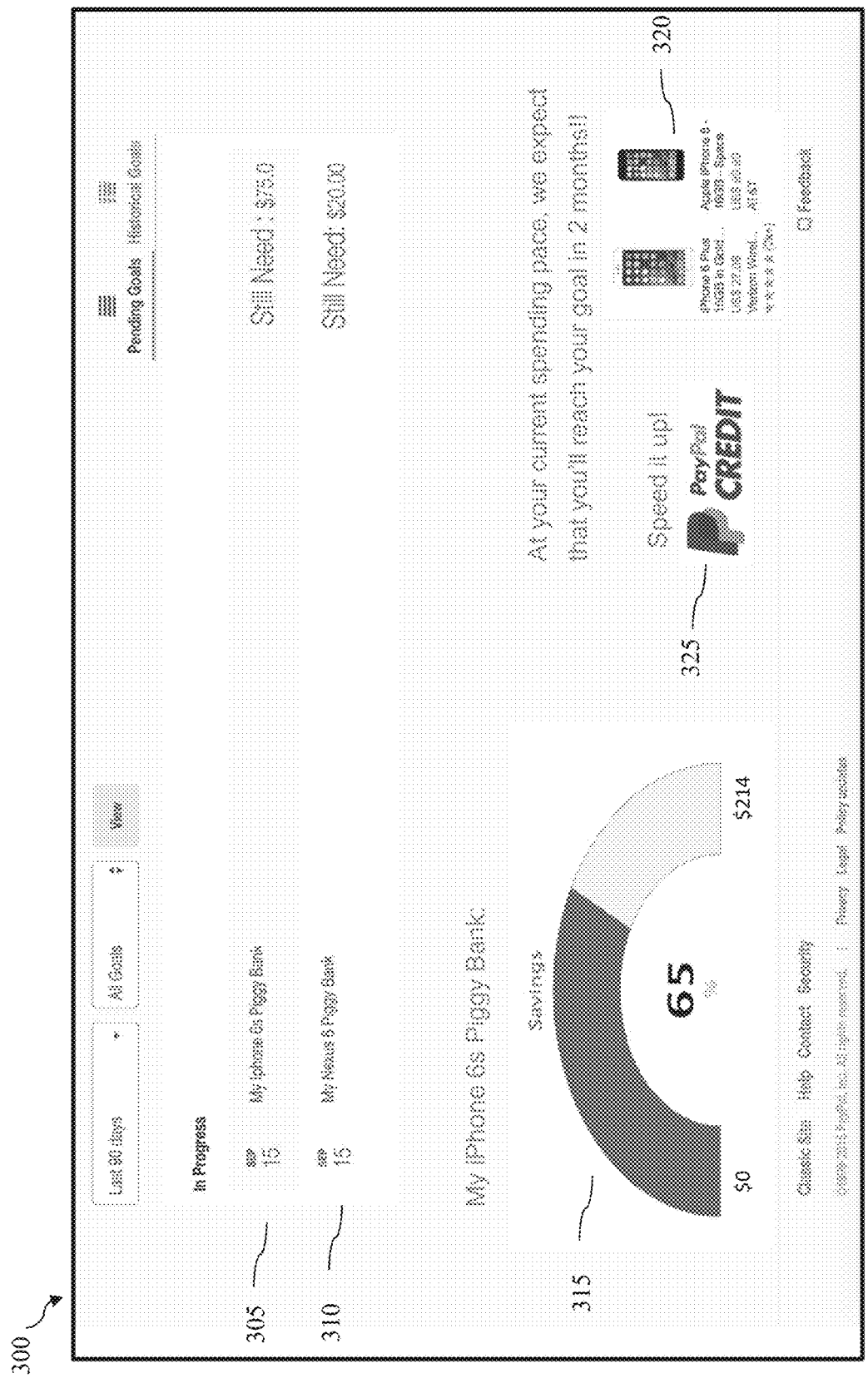
FIG. 3 is a webpage illustrating two savings accounts according to an embodiment of the present disclosure.

FIG. 3 presents a webpage 300 displayed on user device 120 that illustrates two savings accounts 305 and 310. Savings account 305 is for an iPhone 6S, while savings account 310 is for a Nexus 6. The amount still needed for each item is also displayed. In addition, a graphical representation 315 of the amount still needed ($75) for the iPhone 6S is provided on the webpage 300, along with a percentage (65%) of the total savings goal ($214) saved.

To the right of the graphical representation 315 is item pricing and special deals 320, which includes special pricing for the iPhone 6s offered at Verizon Wireless and the regular price offered at AT&T. The user 102 is expected to reach his or her savings goal of buying an iPhone in two months. If the user 102 wants to take advantage of the special price at Verizon Wireless, however, the user 102 can click the credit button 325 to receive credit for the amount that is still needed to purchase the iPhone 6S. The user 102 can choose to speed up his or her savings timeline and use the credit at any point, not only if he or she wants to take advantage of a special price or promotion.

The savings account details and promotions described above are displayed when the user 102 clicks on the savings account 305 for the iPhone 6S. If the user 102 clicks on the savings account 310 for the Nexus 6, a different graphical representation and promotions would be displayed.

Figure 4:
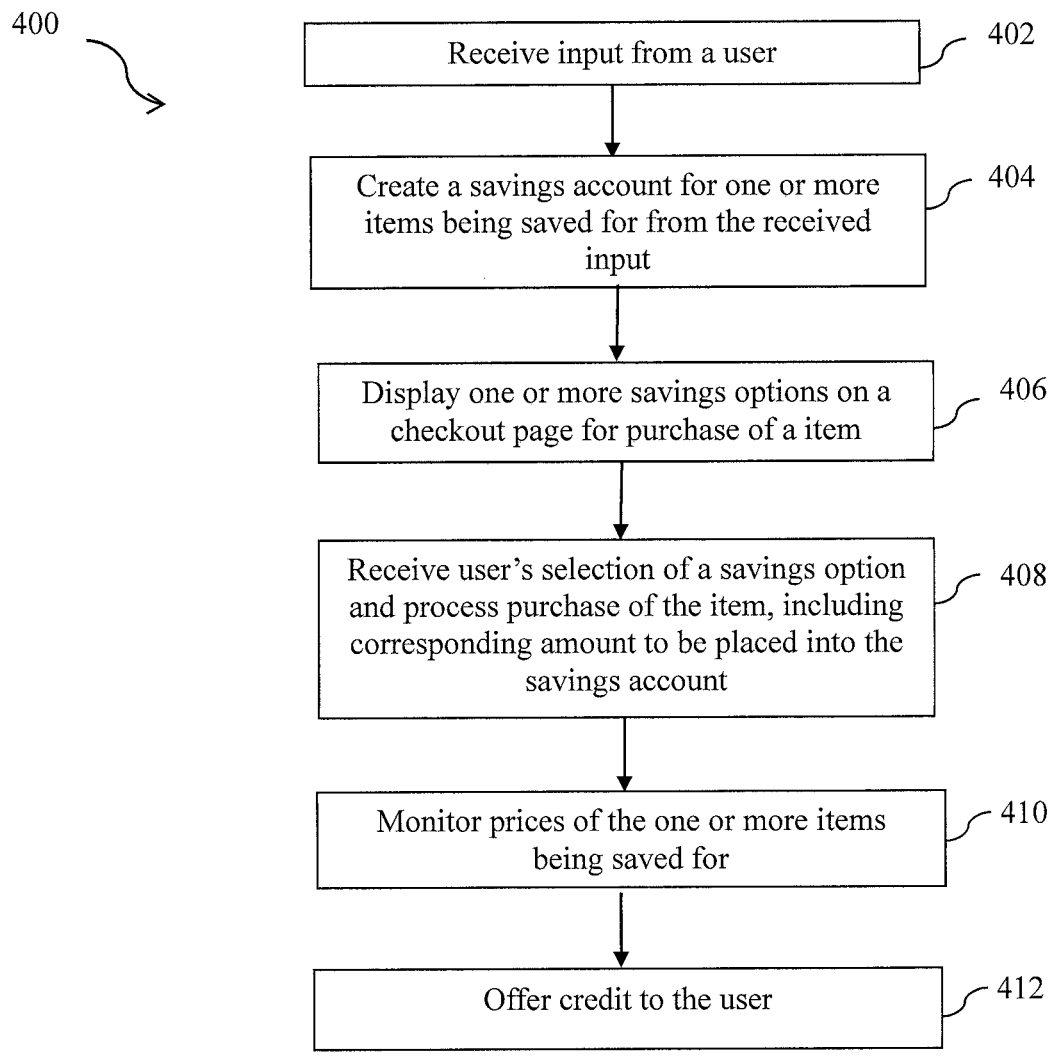
FIG. 4 is a flowchart showing a method of facilitating saving through a GUI according to an embodiment of the present disclosure.

Referring now to FIG. 4, a flowchart of a method 400 of facilitating saving through a GUI is described. User 102 visits a service provider website and decides to create a savings account. At step 402, the service provider server 180 receives input from user 102, including the user's name, one or items being saved for, a savings goal, and a time frame for reaching the savings goal.

At step 404, the service provider server 180 creates a savings account using the received input information. The savings account is added as a feature of a digital wallet managed by the service provider and is integrated seamlessly with other functions available on the GUI of the digital wallet. The user 102 is now able to contribute money to a savings account or multiple savings accounts, and the savings account is added to the user 102's digital wallet.

At step 406, when the user 102 purchases an item and checks out using the service provider, the service provider server 180 displays one or more savings options on the checkout page. For example, the savings options can include a percentage of the price of the item or a set amount. The user 102 selects one of the savings options or inputs a different percentage or amount to be saved.

At step 408, the service provider server 180 receives the user 102's selection or input, and in response to receiving that input, processes the purchase of the item including the corresponding amount to be placed into the savings account. The additional amount is then placed into the savings account.

At step 410, the service provider server 180 searches and monitors the prices on merchant websites for items being saved for by user 102. If there are special deals or sales on an item, service provider server 180 informs the user 102 through the digital wallet that these deals or sales are available for a limited time.

At step 412, the service provider server 180 offers credit to user 102 through the GUI or digital wallet. Credit can be offered at any time, such as when the user 102 is not on track to meeting the savings goal or a low price for a limited time is being offered for an item.

Once the user receives the credit, the user 102 can pay off the debt using the same savings mechanism as described above. Thus, steps 402-408 can be repeated, with the user 102 specifying that the purpose of the savings account is to pay back the debt.

Figure 5:
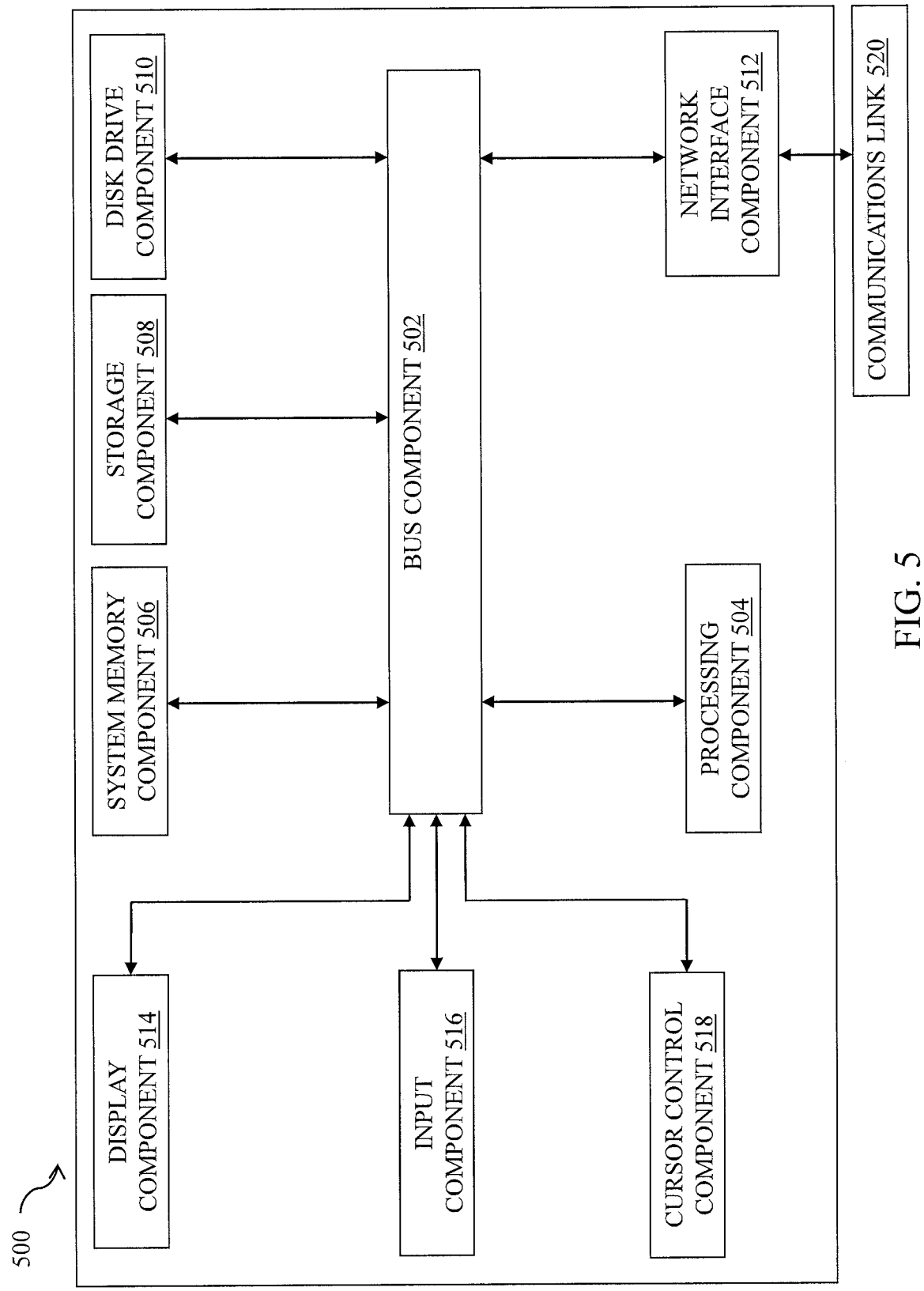
FIG. 5 is a block diagram of a system for implementing one or more components in FIG. 1 according to an embodiment of the present disclosure.

Referring now to FIG. 5 a block diagram of a system 500 is illustrated suitable for implementing embodiments of the present disclosure, including user device 120, merchant server or device 130, and service provider server or device 180. System 500, such as part of a cell phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store user information. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 160 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

Although various components and steps have been described herein as being associated with user device 120, merchant server or device 130, and service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system comprising:
a non-transitory memory; and
one or more hardware processors coupled to the non-transitory memory and configured to read instructions from the non-transitory memory to cause the system to perform operations comprising:
receiving, from a user device through a graphical user interface (GUI) of a payment service provider, a payment request for a purchase associated with a first amount from a merchant using a user account, wherein the user account is associated with one or more funding sources associated with a user;
determining that the user account includes a savings account that is linked to the one or more funding sources associated with the user, wherein the savings account is associated with a desired item;
calculating a second amount for charging against the one or more funding sources based on the first amount and an attribute associated with the savings account, wherein the attribute is determined based on analyzing a purchase history of the user;
presenting, on the GUI, a checkout interface for the purchase, wherein the checkout interface presents information associated with the purchase and the second amount;
receiving a confirmation of the purchase from the user through the GUI;
in response to receiving the confirmation, transferring the first amount from the one or more funding sources to a merchant account associated with the merchant and transferring a third amount corresponding to a difference between the first and second amounts from the one or more funding sources to the savings account;
determining a balance of the savings account; and
processing a payment for purchasing the desired item based on the balance of the savings account.

2. The system of claim 1, wherein the operations further comprise:
creating the savings account for the user based on data received from the user device; and
linking the savings account to a digital wallet of the user.

3. The system of claim 2, wherein the data comprises at least one of a name of the user, the desired item, a savings goal, a target date for reaching the savings goal, or a percentage of future purchases to be placed in the savings account.

4. The system of claim 1, wherein the operations further comprise tracking a progress of the user in reaching a savings goal based on the balance of the savings account.

5. The system of claim 4, wherein the operations further comprise presenting, on the GUI, an amount and a time needed to reach the savings goal determined based on the balance of the savings account.

6. The system of claim 1, wherein the attribute of the savings account comprises at least one of a percentage or a set amount.

7. The system of claim 1, wherein the purchase history indicates a frequency that the user conducts purchase transactions.

8. The system of claim 1, wherein the operations further comprise:
determining an expiration date of one or more incentives for purchasing the desired item;
determining that the balance of the savings account will not reach a purchase price of the desired item before the expiration date of the one or more incentives; and
presenting, on the GUI, an offer of a credit for a difference between the balance of the savings account and the purchase price of the desired item.

9. The system of claim 8, wherein the operations further comprise creating a second savings account for the user account for paying back credit if accepted by the user.

10. The system of claim 9, wherein the operations further comprise:
determining that a balance of the second savings account has reached an amount associated with the credit; and
transferring funds in the amount from the second savings account of the user to an account of a lender associated with the credit.

11. A method comprising:
receiving, by a service provider server via a graphical user interface (GUI) displayed on a user device associated with a user, a payment request for a first purchase transaction associated with a first amount;
determining, by the service provider server, that a user account associated with the user includes a savings account, wherein the savings account is associated with an item;
calculating, by the service provider server, a second amount for charging against one or more funding sources associated with the user account based on the first amount and an attribute associated with the savings account;
presenting, by the service provider server on the GUI, a checkout interface for the first purchase transaction, wherein the checkout interface prompts the user to confirm charging the second amount for the first purchase transaction;
receiving, by the service provider server from the user through the GUI, a confirmation of the first purchase transaction;
in response to receiving the confirmation, processing, by the service provider server, the first purchase transaction including (i) transferring the first amount from the one or more funding sources to a merchant account and (ii) transferring a third amount corresponding to a difference between the first amount and the second amount from the one or more funding sources to the savings account; and
processing a second purchase transaction for purchasing the item using the savings account.

12. The method of claim 11, wherein the attribute of the savings account represents a percentage of a purchase.

13. The method of claim 12, further comprising analyzing a purchase history of the user to determine the percentage.

14. The method of claim 13, wherein the purchase history indicates at least one of items that the user has bought, a frequency that the user shops conducts purchase transactions, or amounts associated with the purchase transactions.

15. The method of claim 11, further comprising:
    determining that a balance of the savings account is insufficient to purchase the item;
    offering a credit to the user for purchasing the item, wherein the second purchase transaction is processed based on the balance of the savings account and the offered credit;
    receiving an acceptance of the credit from the user; and
    in response to processing the second purchase transaction and receiving the acceptance, automatically creating a second savings account for paying back the credit.

16. The method of claim 15, further comprising transferring an amount associated with the credit from the second savings account to an account associated with a lender of the credit.

17. A non-transitory machine-readable medium having stored thereon machine-readable instructions executable to cause a machine to perform operations comprising:
    receiving, from a user device through a graphical user interface (GUI) of a payment service provider, a payment request for a purchase transaction associated with a first amount using a user account, wherein the user account is associated with one or more funding sources associated with the user;
    determining that the user account includes a savings account that is linked to the one or more funding sources associated with the user, wherein the savings account is associated with a desired item;
    calculating a second amount for charging against the one or more funding sources based on the first amount and an attribute associated with the savings account;
    presenting, on the GUI, a checkout interface for the purchase transaction, wherein the checkout interface presents information associated with the purchase and the second amount;
    receiving, from the user through the GUI, a confirmation of the purchase transaction;
    in response to receiving the confirmation, transferring the first amount from the one or more funding sources to a merchant account and transferring a third amount corresponding to a difference between the first and second amounts from the one or more funding sources to the savings account;
    determining a balance of the savings account; and
    processing a payment for purchasing the desired item based on the balance of the savings account.

18. The non-transitory machine-readable medium of claim 17, wherein the operations further comprise creating the savings account based on input received from the user through the GUI.

19. The non-transitory machine-readable medium of claim 17, wherein the operations further comprise analyzing a purchase history of the user to determine the attribute of the savings account.

20. The non-transitory machine-readable medium of claim 17, wherein the operations further comprise:
    determining an expiration date of one or more incentives for purchasing the desired item;
    determining that the balance of the savings account will not reach a purchase price of the desired item before the expiration date of the one or more incentives based on a change of the balance within a predetermined period of time; and
    offering a credit for a difference between the balance of the savings account and the purchase price of the desired item to the user by presenting the offered credit on the GUI.

* * * * *